United States Patent [19]

Nishimura et al.

[11] Patent Number: 5,542,628
[45] Date of Patent: Aug. 6, 1996

[54] ESCAPE DEVICE FOR AIRCRAFT

[75] Inventors: Akira Nishimura; Hideki Kashihara, both of Osaka, Japan

[73] Assignee: Sumitomo Electric Industries, Ltd., Osaka, Japan

[21] Appl. No.: 207,673

[22] Filed: Mar. 9, 1994

[30] Foreign Application Priority Data

| Mar. 10, 1993 | [JP] | Japan | 5-049322 |
| Mar. 10, 1993 | [JP] | Japan | 5-049333 |
| Mar. 10, 1993 | [JP] | Japan | 5-049371 |

[51] Int. Cl.$^6$ ............................ B64D 1/08
[52] U.S. Cl. .............. 244/137.2; 244/905; 182/48; 193/25 B
[58] Field of Search ............... 244/137.2, 905; 182/48, 49; 193/25 B, 25 R

[56] References Cited

U.S. PATENT DOCUMENTS

| 3,440,776 | 4/1969 | Fraioli | 244/905 |
| 3,473,641 | 10/1969 | Fisher | 244/905 |
| 3,829,353 | 8/1974 | Fisher | 244/905 |
| 4,378,861 | 4/1983 | Burrough et al. | 244/905 |
| 4,654,098 | 3/1987 | Miller | 244/905 |
| 4,750,690 | 6/1988 | Conn | 244/126 |

FOREIGN PATENT DOCUMENTS

| 2203712 | 10/1988 | United Kingdom | 244/905 |

*Primary Examiner*—Galen L. Barefoot
*Attorney, Agent, or Firm*—Wenderoth, Lind & Ponack

[57] ABSTRACT

An escape device for aircrafts having a pair of gas bags and a slide member joined to the gas bags. The escape device provides a high resistance to radiation heat and reliable bonding between the sheet members. The sheet member forming the gas bags and the slide member includes a substrate of fabric and covering layers of thermosetting elastomer containing a flame retardant. The sheet members forming the gas bags are bonded together before the covering layer of one of the sheet members hardens completely. A protective layer is provided on the outer surface of the joint portion between the sheet members to reflect radiation heat.

3 Claims, 4 Drawing Sheets

ESCAPE DEVICE FOR AIRCRAFT

BACKGROUND OF THE INVENTION

This invention relates to a device installed on an aircraft for use as an escape slide or a life-saving raft in case of an emergency such as an emergency landing.

Unexamined Japanese Patent Publication 59-152851 discloses; an escape device for an aircraft of this type. It is normally stored in an aircraft in a folded state. In case of an emergency, it is inflated by gas to form a slide.

As shown in FIG. 1, this device comprises an opposed pair of gas bags 1 formed of flexible sheets each having a cylindrical shape, and a sheet member provided between and secured to the gas bags 1. Its top surface serves as a slide surface 2. By inflating the gas bags with gas, this device can be used as a slide. In case the aircraft has landed on the sea, this device can be used as a life raft by detaching it from the aircraft because the gas bags 1 have buoyancy.

When using the device as a slide, the gas bags 1 serve to keep the shape of the slide. Thus, they have to have a sufficient rigidity. If the device is used as a life raft, the bags serve as floats for keeping the raft afloat on the water. It is therefore essential that the joint portions of the sheets forming the gas bags stably exhibit a high bond strength and air-tightness.

If a fire breaks out in an emergency situation, the escape device will be exposed to very high temperatures. The joint portions of the sheets forming the gas bags are thus required to maintain high bond strength even under high-temperature conditions.

For this purpose, as shown in FIG. 10, Unexamined Japanese Patent Publication 59-152851 proposes to form the gas bags and the slide surface from sheet members 41 having covering layers 42, 43 made of a thermoplastic polymer. The sheet members 41 are bonded together through a heat-resistant adhesive. On the outer side of the bonded portion is applied a protective layer 44 made of a thermoplastic polymer containing metallic particles to reflect the radiation and minimize the temperature rise at the joint portion.

Such a conventional escape device has the following problems.

(1) If exposed to radiation, the covering layers 42, 43 of the sheet member 41 will be heated and soften, thus lowering the strength of the sheet. If exposed to high radiation, the thermoplastic polymer forming the sheet members may melt. Since the gas pressure in the gas bags rises when heated, the thermoplastic polymer of the covering layer may be pushed outwards by the inner pressure. In an extreme case, the bag might be broken. Air-tightness is lost if this happens.

If the covering layer 43 forming the slide surface, which is also made from a thermoplastic polymer, is heated and softens, the frictional resistance of the slide surface may increase sharply to such an extent that the escape device loses its ability to function as a slide.

Furthermore, if the sheet member 41 is formed solely of a nylon fabric or a covering layer of thermoplastic polymer, it may catch fire if a fire breaks out near the escape device. In an extreme case, the entire escape device may be burned down.

(2) Since an adhesive is used to bond the sheet members together, poor quality of the adhesive used or a poor job of applying the adhesive or bonding the sheet members together would affect the bonded state and bond strength. For example, if voids are present between The sheet members bonded together, they may expand when heated, thus quickening the peeling at the bonded portion.

Since it is difficult to check the bond strength between the sheet members by subjecting them to destruction tests or sampling tests, it is essential to strictly control the quality of the adhesive used and the work for applying adhesive and bonding the sheets. Thus, the work efficiency is extremely low.

(3) The protective layer 44, formed from a thermoplastic polymer, turns into a dense solid layer when hardened and shows a high heat conductivity. The metallic particles, which are mixed to reflect radiation, act as a good conductor. Thus, if exposed to radiation heat, the protective layer tends to conduct a large amount of heat to the sheet member and thus cannot suppress a temperature rise at the bonded portion.

(4) The sheet members 41, covered with a thermoplastic polymer, are joined together with an adhesive. Thus, if the thermoplastic polymer is heated and softens, the bond strength will drop sharply. The bonded state may be broken as a result. Especially if the joint portions are exposed to extremely high radiation, the thermoplastic polymer forming the protective layers of the sheet members may melt and flow out from the joint portions as shown by the chain line in FIG. 10 even if the adhesive used is a heat-resistant urethane polymer. The joint portions may be broken if this happens.

In an arrangement in which the protective layer is formed by applying a molten polymer to the sheet members, if the polymer is applied unevenly, radiation will be reflected unevenly, too. Especially if the joint portions are long, it is very difficult to apply a polymer evenly. Workability is thus low.

SUMMARY OF THE INVENTION

It is an object of the present invention to provide an escape device for use in an aircraft which can withstand high temperatures, which retains high bond strength at the joint portions at least for a period necessary for passengers to escape from the aircraft and which can be reliably used as a slide and a life raft.

Another object of this invention is to provide a method of manufacturing such an escape device in which the sheet members themselves or the sheet members and the protective films can be joined together securely and reliably.

According to this invention, there is provided an escape device for an aircraft comprising a pair of gas bags each formed of sheet members joined together into a cylindrical shape and arranged parallel to each other, and a sheet member forming a sliding surface and disposed between and joined to the pair of gas bags, the gas bags being inflatable by blowing gas thereinto to form a slide, characterized in that the sheet members forming the gas bags being each have a covering of a thermosetting elastomer.

The thermosetting elastomer should preferably contain a flame-retardant so that it has self-extinguishability.

The joint portions between the sheet members forming the gas bags may be joint together partially or entirely by stitching.

Further, each joint portion between the sheet members forming the gas bags has its inner surface covered with a seal made from a thermosetting elastomer. The seal may be provided only on the portion at which the sheet members are stitched together.

Each joint portion between the sheet members forming the gas bags has its outer surface covered with a protective layer capable of reflecting radiant heat.

The protective layer may be a tape made from a thermosetting elastomer containing metallic powder or comprises a reflecting layer containing metallic powder and a non-dense layer having evenly dispersed fine pores.

The protective layer may be formed only on the portion at which the sheet members are stitched together.

There is also provided a method of manufacturing an escape device for an aircraft, the method comprising the steps of forming a pair of cylindrical gas bags each by bonding together ends of sheet members having an elastomer covering, bonding a sheet member having an elastomer cover to the pair of gas bags to fix the gas bags parallel to each other and thereby form a sliding surface between the gas bags, and bonding a protective film having an elastomer covering to the outer surface of each joint point at which the ends of the sheet member forming each gas bag are joined, characterized in that the ends of the sheet members forming the gas bags are bonded together, respectively, before the elastomer covering of one of the sheet members hardens completely.

The sheet members and the protective films are preferably bonded together before the elastomer covering of at least one of the sheet member and the protective film hardens.

Since the coverings of the sheet members are formed from a thermosetting elastomer, they will harden if heated when exposed to heat. They will never melt or flow, so that they will not be broken. Further, since the covering layers do not soften, the sheet members are kept in the bonded state, so that the gas bags can be sealed airtightly. Also, the frictional resistance of the sliding surface is kept low.

Joining the ends of the sheet members by stitching eliminates problems otherwise caused by poor quality of the adhesive and poor workmanship when applying adhesive and laminating sheets.

Moreover, when the ends of the sheet members are joined together by stitching, the joint portions will never soften even if heated unlike joint portions which utilize adhesive. Thus, they maintain their bond strength so that the gas bags can maintain their original shape even if the air-tightness at the joint portions changes slightly. The entire device can thus keep its shape as a slide or a life raft.

If the gas bags are heated and their gas pressure increases, the seals are pressed against the sheet members, thus sealing the joint portions. The joint portions are thus kept airtight. The seals applied to the stitched portions serve to prevent the gas from leaking through the gaps around the yarns constituting the stitching.

The protective layers provided on the stitched portions serve to reflect radiant heat and thus to temperature increases at the stitched portions.

Such a protective film may be made of a reflecting layer and a non-dense layer. Air gaps dispersed uniformly in the non-dense layer serve to suppress heat conduction from outside of the protective film to the boned portion. Such a non-dense layer is preferably made of an elastic material so that it is resiliently deformable when the sheet members are folded. For example, it may be a spongy or fabric material, which is desirable because it is possible to design for its thermal conductivity or the thickness of the protective film by selecting an appropriate fabric structure or pore size of the sponge.

According to the manufacturing method of this invention, the ends of the sheet members are laminated together before the elastomer coverings are hardened, so that the bonds are strong. By using a crosslinking type of adhesive, a partial crosslinking reaction will occur between the adhesive and the unhardened covering. This further enhances the bond strength.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

First Embodiment

The first embodiment of the escape device comprises cylindrical gas bags 1 formed of sheet members 3 and arranged parallel to each other, and a sheet member 4 forming a flat slide surface 2 and having its both sides bonded to the gas bags 1.

Figure 2:
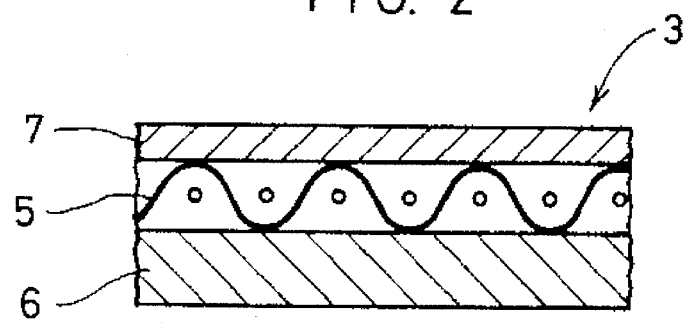
FIG. 2 is a sectional view of part of the sheet member forming the gas bag of a first embodiment of the escape device.

The sheet members 3 for the gas bags 1 comprise, as shown in FIG. 2, a substrate 5 of a flexible fabric and covering layers 6 and 7 covering the inner and outer surfaces of the substrate 5, respectively. The inner covering layer 6 is made from an ether type of thermosetting elastomer formed by adding a flame-retardant to a polyurethane polymer to make it self-extinguishing. The outer covering layer 7 is formed by adding metallic powder such as aluminum powder to the above-mentioned either type of thermosetting elastomer containing a flame-retardant. By adding metallic powder, this layer can reflect radiation.

Figure 3:
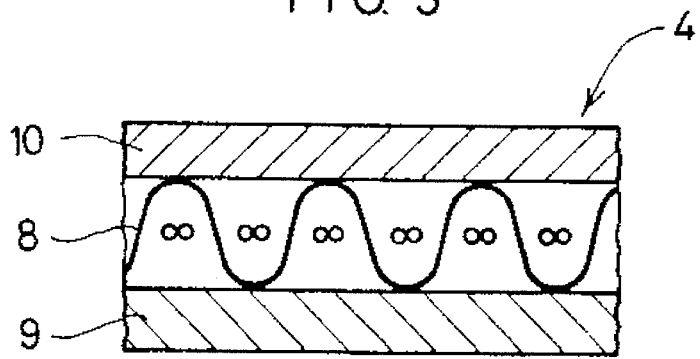
FIG. 3 is a sectional view of part of the sheet member forming the sliding member of the same.

On The other hand, the sheet member 4 forming the slide surface 2 comprises, as shown in FIG. 3, a substrate 8 formed of a flexible fabric and covering layers 9 and 10 covering the inner and outer surfaces of the substrate 8, respectively. The inner covering layer 9 is, as with the sheet members 3 forming the gas bags 1, made from an ether type of thermosetting elastomer formed by adding a flame-retardant to a polyurethane polymer to make it self-extinguishing. The outer covering layer 10 is made from a thermosetting elastomer containing metallic powder for promoting better sliding action and a conductive material to impart to the slide surface electrical conductivity. A flame-retardant may be added to the covering layer 10, too.

Figure 1:
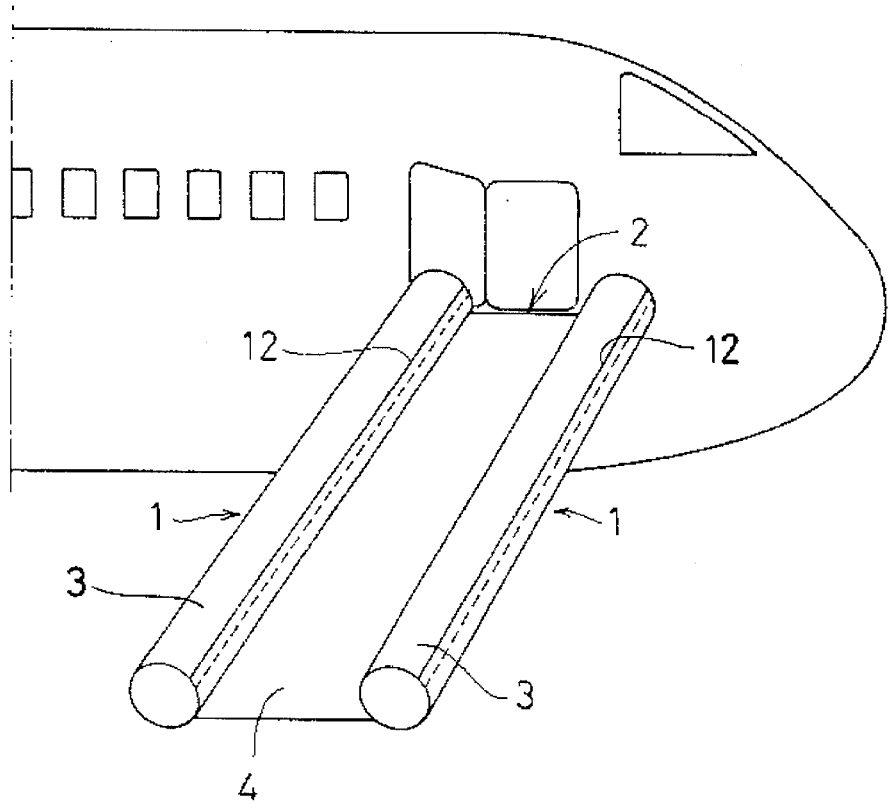
FIG. 1 is a perspective view of the escape device for an aircraft according to the present invention.
Figure 4:
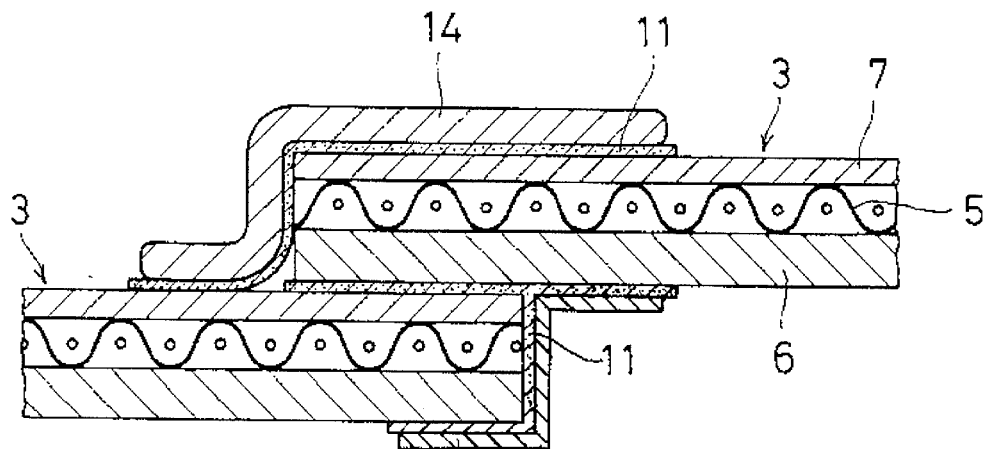
FIG. 4 is a sectional view of the joint portion between the sheet members of the same.

As shown in FIG. 4, the sheet member 3 forming each gas bag 1 has its opposed ends overlapped by a predetermined width. The overlapped portions are bonded together (as shown by lines 12 in FIG. 1) through an adhesive 11 of a heat-resistant crosslinking polyurethane polymer. In order to bond the ends of the sheet member 3, they are heated and laminated together with the adhesive interposed therebetween, before the thermosetting elastomer in the covering layers 6, 7 hardens completely.

Sealing strips 13 are bonded to the sheet members 3 along the sealing lines 12 from inside the gas bags 1. The seal strips 13 are pieces cut from a sheet of a thermosetting elastomer. In the same manner as in bonding the sheet members 3 together, they are bonded to the sheet members 3 by means of a crosslinking adhesive 11 before the thermosetting elastomer hardens completely. The sealing strips 13 serve to prevent gas leakage through the overlapped ends of the sheet members 3. They are bonded so as to cover the overlapped end portions of the sheet members 3 and the connecting portions between the gas bags 1 and the sheet members 3 forming the ends of the gas bags 1.

Figure 5A:
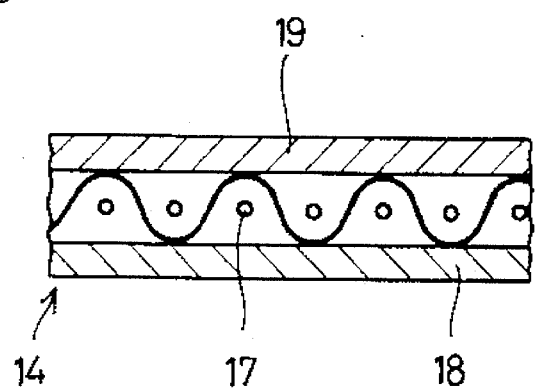
FIG. 5(a) to 5(c) are sectional views of the internal structure of the protective layer of the same.

The outer side of each joint portion of the sheet members 3 is divided into three parts to which are bonded protective films 14, 15 and 16, respectively, which have different internal structures from each other. Of the three different kinds of protective films, the protective film 14 comprises, as shown in FIG. 5(a), a non-dense layer 17 having a fabric structure with fine pores distributed uniformly, a covering layer 18 covering the inner surface of the non-dense layer 17, and a reflecting layer 19 covering the outer surface thereof. The covering layer 18 is made from a thermosetting elastomer containing e.g. a polyurethane polymer as a base component. The reflecting layer 19 is formed by mixing metallic powder such as aluminum powder into the above-mentioned thermosetting elastomer.

Figure 5B:
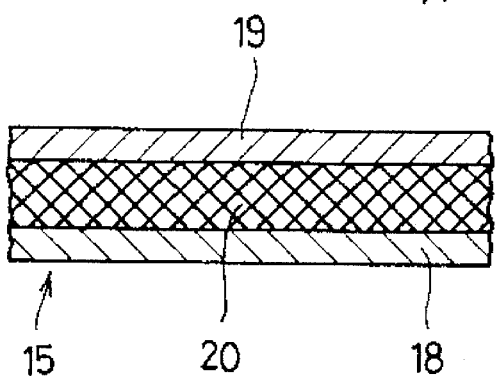

As shown in FIG. 5(b), the protective film 15 has a non-dense layer 20 made from a urethane sponge having numerous continuous air gaps. On both sides of the non-dense layer 20 are provided a covering layer 17 and a reflecting layer 18, which are the same as those used in the protective film 14.

Figure 5C:
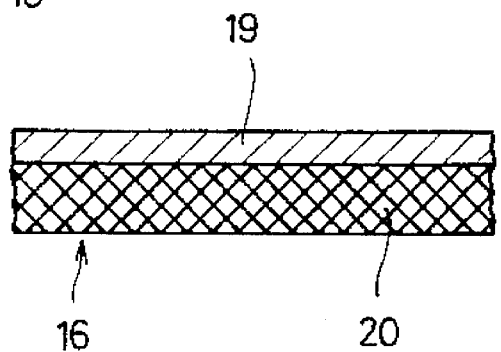

The protective film 16 comprises, as shown in FIG. 5(c), a non-dense layer 20 made of a urethane sponge and a reflecting layer 19 made of a thermosetting elastomer containing metallic powder.

The protective films 14, 15 and 16 are cut beforehand into strips and, with a crosslinking adhesive 11 applied to their inner surfaces and the outer surface of the sheet members 3, bonded to the sheet members 3 so as to cover the entire width of the bonded portions. The inner covering layers 18 of the protective films 14 and 15 are heated and, before the thermosetting elastomer forming the layers 18 hardens completely, the films 14, 15 are bonded to the sheet members 3. The protective film 16 having no inner covering layer is bonded to the sheet members 3 after applying a larger amount of crosslinking adhesive thereto than to the other films.

The sliding surface 2 and the gas bags 1 are bonded together by bonding both ends of the sheet member 4 forming the sliding surface 2 to the underside of the pair of gas bags 1 through a crosslinking adhesive. The sheet member 4 is bonded with its covering layer 10 having electrical conductivity facing up for promoting better sliding.

Next, the advantages of the present invention will be described. Since the covering layers 6, 7, 9 and 10 of the sheet members 3, 4 are made from a thermosetting elastomer, they will never melt or flow even if exposed to high temperatures. Thus, the sheet members are kept airtight and the air bubbles, if any, trapped in the covering layers will barely inflate. Moreover, since the covering layers never flow, they can be used as adherers without the possibility of the joint portions being destroyed. Also, since the covering layer 10 of the sheet member 4 forming the sliding surface never softens, the frictional resistance on the surface will never change, so that people can slide down it easily.

Since the thermosetting elastomer forming the covering layers contains a flame-retardant and thus exhibits self-extinguishability, even if the members 3, 4 should catch fire, the fire will die down soon and not spread.

Since the covering layers are formed from a thermosetting elastomer containing a polyurethane polymer as a base component, they are relatively lightweight and have high wear resistance and bond well. Furthermore, since polyurethane polymer can be hardened at room temperature by adjusting the hardening agent used, such layers can be manufactured easily. An ether type of polyurethane polymer is selected as the polymer forming these layers in the embodiment. An ether type of polyurethane polymer is known to have higher water resistance than an ester type.

If the escape device is exposed to radiation, the radiation is reflected by the reflecting layers 19 of the protective films 14, 15 and 16 bonded to the joint portions of the sheet members 3. Also, the numerous air gaps present in the non-dense layers 17, 20 in the protective films serve to exhibit heat conduction and minimize the amount of heat conducted to the sheet members 3.

Since the temperature hardly increases at the joint portions of the sheet members, the covering layers 6, 7 in the sheet members are less likely to soften or peel off from the adhesive. Thus, the bonded state is maintained stably.

Since the opposed ends of the sheet member 3 and the protective films 14, 15 and the sheet members 3 are bonded together before the surface layer of thermosetting elastomer hardens completely, they can be bonded together strongly.

Now, various experiments conducted to examine the durability of the escape device will be discussed.

First we prepared a gas bag having the structure of that of the first embodiment (hereinafter referred to as Specimen) and a gas bag manufactured according to the teachings of the above-mentioned Japanese Patent Publication 59-152851 (Comparative Example) and they were subject to durability tests in which they were exposed to radiation.

Figure 7:
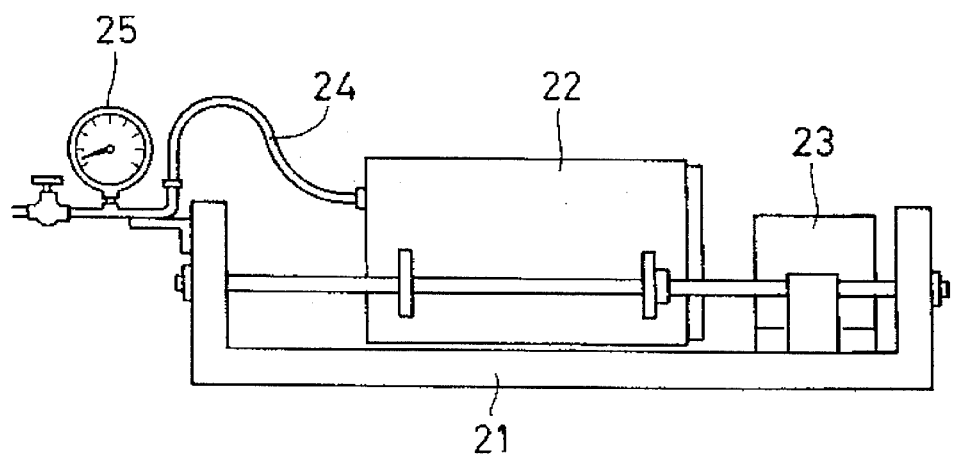
FIG. 7 shows the test device used to conduct the durability test.

The test device used to conduct the test is shown in FIG. 7. It has a pressure container 22 for receiving the gas bags, and an electric heater 23 provided opposite to the pressure container 22 mounted on a fixed base 21. To the pressure container 22 are connected a hose 24 for supplying high-pressure air and a pressure gauge 25. The pressure container 22 is a cylindrical member having a diameter of 178 mm and an overall length of 314

Figure 6:
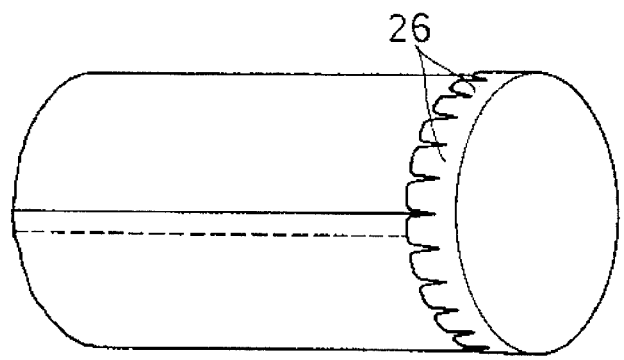
FIG. 6 is a perspective view of the gas bag used in the durability test.

As shown in FIG. 6, the gas bags used in the test were cylindrical so that they could be fitted in the pressure container 22. Ends of the gas bags were closed by other sheet members.

Table 1 shows the structure of the sheet members forming the Specimen and Comparative Example and the kinds of adhesives used.

Referring to Table 1, the thermosetting elastomer forming the covering layer of the Specimen was made from a polyurethane polymer containing Polyol 0265 and Isocyanate 0620 (trade names) made by Sumitomo Bayer Urethane Co., Ltd. To this polymer base was added a flame-retardant which is a mixture of BT-93W (trade name) made by Ethyl Corporation and antimony trioxide.

The sealing strips 13 laminated to the inner surface of the joint portions of the sheet members 3 were made from the same polyurethane polymer as mentioned above (thermosetting elastomer) but not containing a flame-retardant. These strips were 1 mm thick and bonded to the sheet member through a crosslinking adhesive.

Table 2 shows the detailed structures of the protective films 14, 15 and 16 provided on the outer side of the the sheet members of Specimen and of the protective layers provided on the sheet members of the Comparative Example.

Referring to Table 2, the thermosetting elastomer forming the covering layers 18 and the reflecting layers 19 are made from a polyurethane polymer which is a mixture of Polyol 0265 and Isocyanate 0620 (trade names) made by Sumitomo Bayer Urethane Co., Ltd.

The protective films 14, 15 and 16 are in the form of strips having a width larger than the width of the joint portions of the sheet members so that they can completely cover the joint portions. They were bonded to the sheet members through a crosslinking adhesive.

The bonding of the sheet members 3 to the sealing strips 13, and to the protective filmes 14, 15 were carried out before the thermosetting elastomers on the mating surfaces hardened completely.

The adhesive used in the Specimen was a polyurethane polymer adhesive which was a mixture of Desmocoll 540 and RE (trade names) made by Sumitomo Bayer Polyurethane. The adhesive used in the Comparative Example was Paraprene (trade name) made by Japan Polyurethane Industries Co., Ltd.

Both the Specimen and Comparative Example had a cylindrical body with one end thereof closed by another sheet member which was folded along its edge onto the outer periphery of the cylindrical body so as to overlap the cylindrical body by more than 75 mm as shown in FIG. 6 and which was bonded thereto with an adhesive. A protective layer was further wound around and bonded to the folded portion 26.

In the durability test, fragments cut from the gas bags of the Specimen and Comparative Example were fitted in the pressure container 22 of the test device shown in FIG. 7; air was introduced into the pressure container 22 to increase the internal pressure of the gas bags to 0.182 kgf/cm$^2$; and the electric heater 14 was turned on to radiate heat against the sheet members of the gas bags at a rate of 2.0 Btu/ft$^2$/sec.

The gas bags were tested for their performance by measuring the time until the internal pressure began to decrease sharply as a result of air leakage through pin holes that developed in the sheet members of the gas bags.

During the tests, when the sheet members of the Comparative Example, which were covered with a thermoplastic polymer, were heated for about 150 sec., the covering layer melted and the thus molten covering layer flowed due to the gas pressure in the bag. As a result, the sheet members were broken, causing gas leakage. In contrast, the covering layer of the Specimen never softened or flowed, so that airtightness was maintained, although its surface turned brownish after the sheet members were heated for 990 sec.

At the joint portions of the sheet members of the Comparative Example, the covering layer of thermoplastic polymer melted and flowed when the sheets were heated for about 150 sec. The bond strength thus dropped, resulting in separation at the joint portions. The sheet members forming the gas bag of the Specimen showed no such separation at the joint portions of the sheet members or at the joint portion between the sheet member and the protective film, even after the sheet members were heated for 300 sec.

As a second durability test, the gas bags of the Specimen and Comparative Example were subjected to a heat resistance test under ASTM Standards D4372.

During the test, the gas bag of the Specimen, which contained a flame-retardant in the covering layer, scarcely caught fire, while the Comparative Example, which contained no flame-retardant, caught fire and the fire spread until the entire specimen was burned.

Third durability test was conducted on a sheet having a substrate 5 of nylon fabric covered with an ether type of polyurethane polymer, and on a sheet member as a comparative example having the same substrate as above but covered with an ester type of polyurethane polymer. They were subjected to a hydrolysis test in which the sheet members were exposed to an environment kept at a humidity of 95% or higher and a temperature of 58° C. for 50 days.

In the test, the covering layer of the sheet member of the comparative example decomposed and disappeared. The sheet member according to the present invention maintained its air-tightness although its covering layer softened slightly.

Second Embodiment

Figure 8:
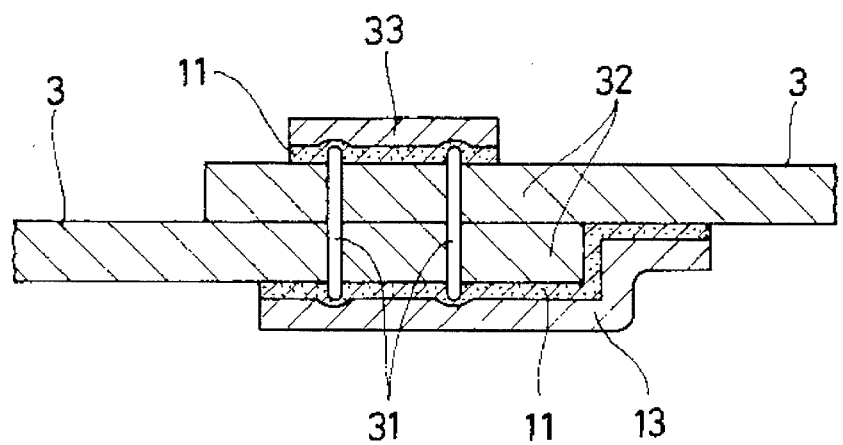
FIG. 8 is a sectional view of one example of a stitch structure of the sheet members of a second embodiment of the escape device.
Figure 9:
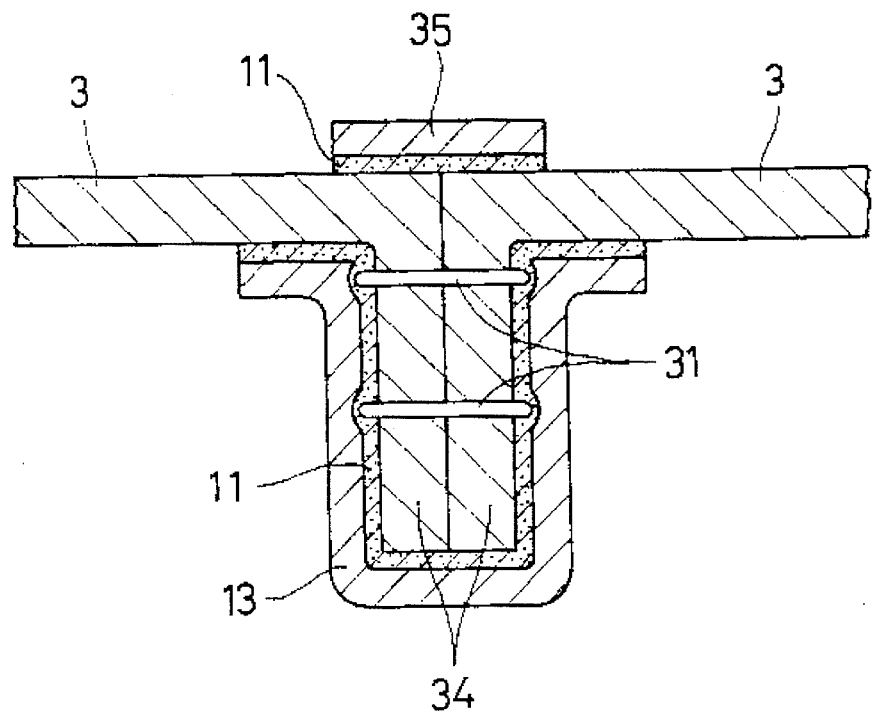
FIG. 9 is a similar view but of another stitch structure of the same.
Figure 10:
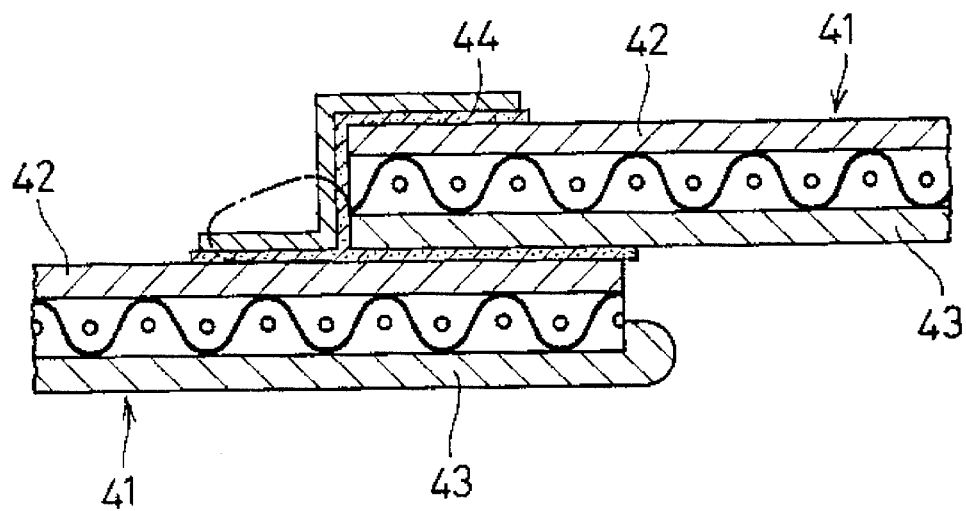
FIG. 10 is a sectional view of the joint portion of a conventional escape device.

FIGS. 8 and 9 show the second embodiment in which each gas bag was made by stitching the overlapped ends of the sheet members.

Namely, in this embodiment, each gas bag 1 was formed by overlapping opposed ends of the sheet members 3 and stitching them together with a heat-resistant yarn 31 such as a polyaramid yarn, nylon or polyester yarn. The joint line on the inner side of each gas bag has a structure shown in FIG. 8, while the joint line on the outer side has a structure as shown in FIG. 9.

The structure shown in FIG. 8 is formed by stitching overlapped ends 32 of the sheet members 3 with the stitching yarn 31 in two rows and then applying a sealing strips 13 to the inner surface of each stitched portion. In order to prevent gas leakage through the overlapped ends of the sheet members 3 and around the yarn 31, the sealing strip 13 is bonded to the sheet members in such a way that it covers the surroundings of the exposed portion of the yarn 31 and the ends of the sheet members.

On the outer surface of each stitched portion is laminated a protective layer 33 for reflecting radiation. The protective layer 33 is formed by heating a thermosetting elastomer containing metallic powder into a liquid state and applying the liquid elastomer to the stitched portion together with a crosslinking type of adhesive. The protective layer 33 is provided in order to protect the stitching yarn 31 against radiation and to prevent the gas from leaking through gaps formed around the yarn 31. It is laminated on the stitched portion so as to cover the exposed portion of the stitching yarn 31 and its surrounding area. The protective layer may be a tape.

The structure shown in FIG. 9 is formed by bending the ends of the sheet members 3 at a right angle, butting them together and stitching the overlapped portions together with a stitching yarn 31 in two rows. A sealing strip 13 formed of a thermosetting elastomer is bonded to the inner side of the stitched portion so as to cover the surroundings of the exposed portion of the stitching yarn 31 and the overlapped ends of the sheet members that extend from end-to-end of the gas bag 1.

Further, a protective layer 35 in the form of a strip is applied to the outer side of the overlapped ends of the sheet members 3. This protective layer 35 is formed by cutting a sheet of thermosetting elastomer containing metallic powder into strips. It is laminated on the surfaces of the sheet members 3 through a crosslinking type of adhesive 11. This protective layer 35 does not directly cover the stitching yarn 31. However, if the overlapped portions 34 are pulled apart from each other, the opening formed will be covered by the protective layer 35, so that the stitching yarn will never be exposed to the atmosphere. Thus, the protective layer serves to protect the stitched portion against radiation.

The gas bags 1 and the sheet member 4 having the sliding surface 2 are joined together by bonding the side edges of The sheet member 4 to the underside of the gas bags 1 by means of a crosslinking adhesive as in the first embodiment. The sheet member 4 and the gas bags 1 are bonded together through an adhesive, not by stitching, because the bonded portions thus formed will not affect the air-tightness of the gas bags 1. Even if the bonded state of the sheet member 4 should change slightly, the overall shape of the device changes little, so that it can be used as a slide or a life raft.

Since the ends of the sheet members 3 forming the gas bags are joined together to form a gas bag by mechanical means, i.e. by stitching, it is possible to eliminate problems such as those otherwise created by poor workmanship in applying an adhesive or laminating tapes.

Using a stitching yarn 31 made from a highly crystallizable, high-melting point, high-strength, fibrous, high-polymer material, such as polyaramid, nylon or polyester, enhance the bond strength and heat resistance. Thus, even if the sheet members and their covering layers are heated and soften, the bonded state can be maintained, so that the gas bag can retain its shape stably.

The sealing strip 13 laminated on the inner surface of the stitched portion serves to prevent the inside gas from leaking out along the stitching yarn 11 or through any defects such as pin holes formed in the ends of the sheet members 3 and the covering layers 7, 10. The gas bag 1 can maintain its air-tightness.

The protective layers 33, 35 which cover the outer surface of the stitched portion serve to suppress temperature increase by reflecting the radiation and also serve as a seal for preventing gas from leaking along the stitching yarn 11. Since the protective layers 33, 35 are made from a thermosetting elastomer, they exhibit high heat resistance and elasticity. Due to the high elasticity, the device can be easily folded at the joint portions.

FIGS. 8 and 9, show structures in which the ends of the sheet members 3 are overlapped and stitched together. The overlapped ends may be bonded together through a crosslinking type of adhesive before stitching them together. By bonding the ends beforehand, stitching the ends together will be easier because they have been fixed. Also, the adhesive layer serves as a seal for preventing air from leaking through the overlapped ends of the sheet members. This layer also serves to increase the bond strength.

In The second embodiment, the outer and inner joint portions of the gas bags have different structures as shown in FIGS. 8 and 9, but they may have the same structure, i.e. one of the two structures shown in FIGS. 8 and 9.

The ends of the sheet members 3 may be stitched together only along the outer joint lines or only at one end of the inner and outer joint lines nearer to the body of the airplane, because these portions are more likely to be exposed to heat. At the other portions, the ends of the sheet members may be joined together by adhesive. Such a structure is more heat-resistant than a structure in which the ends of the sheet members are joined together solely by adhesive.

A gas bag prepared by stitching two sheet members together in the manner shown in the second embodiment, and a gas bag manufactured according to the teaching of Japanese Patent Publication 59-152851 were subjected to a durability test in which they were exposed to heat.

The test device used to conduct the test is shown in FIG. 7. The gas bags used in the test were cylindrical so that they could be fitted in the pressure container 22. Their ends were closed by another sheet, the outer edge of which was folded back.

Table 3 shows the structure of the sheet members and the protective layers forming the gas bags.

Referring to Table 3, the thermosetting elastomer forming the covering layer and the protective layer of the gas bag having the stitched structure was made from a polyurethane polymer container Polyol 0265 and Isocyanate 0620 (trade names) made by Sumitomo Bayer Urethane Co., Ltd.

One of the joint lines of the gas bag at one side had the structure shown in FIG. 8. Along this line, sheet ends were overlapped by 40 mm and the overlapped ends were stitched together with a nylon yarn in two rows which were spaced about by 10 mm. The joint line at the other side had the structure shown in FIG. 9. Along this line, sheet ends were overlapped by 30 mm and the overlapped ends were stitched together with a nylon yarn in two rows which were spaced apart from each other by 5 mm.

A sealing strip 13 was applied to the inner surface of each stitched portion through an adhesive. It was formed by cutting a 1 mm thick sheet of a polyurethane polymer-based thermosetting elastomer into strips.

In the durability test, the gas bags having the stitched structure and those having the bonded structure were fitted in the pressure container 22 of the test device shown in FIG.

7 and, in the same manner as in the above-described tests, air was introduced into the pressure containers 22 to increase the internal pressure of the gas bags to 0.182 kgf/cm$^2$; and the electric heater 23 was turned on to radiate heat against the sheet members of the gas bags at the rate of 2.0 Btu/ft$^2$/sec.

During the test, when the gas bag having the bonded structure were heated for about 150 sec., peeling occurred at the bonded portions of the sheet members and the internal pressure of the bag dropped sharply.

In contrast, the gas bag having the stitched structure suffered no reduction in internal pressure even after it was heated for 990 sec.

TABLE 1

|  |  | Specimen | Comparative example |
|---|---|---|---|
| Sheet member | Substrate | Nylon fabric (2 × 2 basket weave of 210 denier nylon yarn) | Nylon fabric (Plain weave of 210 denier nylon yarn) |
|  | (Density) | (41 + 41) warps × (41 + 41) wefts/inch | 82 warps × 52 wefts/inch |
|  | (Weight) | 160 g/m$^2$ | 130 g/m$^2$ |
|  | Covering layer <inner> | Thermosetting elastomer | Thermoplastic polymer |
|  | (Weight) | 80 g/m$^2$ | 70 g/m$^2$ |
|  | Covering layer <outer> | Thermosetting elastomer containing aluminum powder | Thermoplastic polymer containing aluminum powder |
|  | (Weight) | 30 g/m$^2$ | 30 g/m$^2$ |
| Adhesive |  | Polyurethane polymer crosslinking type of adhesive | Urethane polymer adhesive |

TABLE 2

| Specimen | Protective layer 14 | Non-dense layer | Nylon fabric | 40 |
|---|---|---|---|---|
|  |  | Covering layer | Thermosetting elastomer (Weight 100 g/m$^2$) |  |
|  |  | Reflecting layer | Thermosetting elastomer containing aluminum powder (Weight 50 g/m$^2$) |  |
|  | Protective layer 15 | Non-dense layer | Urethane sponge | 45 |
|  |  | Covering layer | Thermosetting elastomer (Weight 100 g/m$^2$) |  |
|  |  | Reflecting layer | Thermosetting elastomer containing aluminum powder (Weight 50 g/m$^2$) |  |
|  | Protective layer 16 | Non-dense layer | Urethane sponge |  |
|  |  | Reflecting layer | Thermosetting elastomer containing aluminum powder (Weight 50 g/m$^2$) |  |
| Comparative example | Protecting layer |  | Thermoplastic polymer containing aluminum powder |  |

TABLE 3

|  |  | Stitching structure | Bonded structure |
|---|---|---|---|
| Sheet member | Substrate | Nylon fabric (2 × 2 basket weave of 210 denier nylon yarn) | Nylon fabric (Plain weave of 210 denier nylon yarn) |
|  | (Density) | (41 + 41) warps × (41 + 41) wefts/inch | 82 warps × 52 wefts/inch |
|  | (Weight) | 160 g/m$^2$ | 130 g/m$^2$ |
|  | Covering layer <inner> | Thermosetting elastomer | Thermoplastic polymer |
|  | (Weight) | 80 g/m$^2$ | 70 g/m$^2$ |
|  | Covering layer <outer> | Thermosetting elastomer containing aluminum powder | Thermoplastic polymer containing aluminum powder |
|  | (Weight) | 30 g/m$^2$ | 30 g/m$^2$ |
| Protective layer | (Structure) | Thermosetting elastomer containing aluminum | Thermoplastic polymer containing aluminum |

TABLE 3-continued

| | Stitching structure | Bonded structure |
|---|---|---|
| | powder | powder |
| Stitching yarn | Nylon yarn of 1260 denier | — |
| Adhesive | — | Urethane polymer adhesive |

What is claimed is:

1. An escape device for an aircraft, said device comprising: a pair of cylindrical gas bags disposed parallel to each other, a member in the form of a sheet defining a sliding surface and disposed between and joined to said pair of cylindrical gas bags, said gas bags being inflatable to form a slide, and each of said gas bags being of a material comprising a substrate covered with a thermosetting elastomer containing a flame retardant which makes the gas bags self-extinguishing, and each of said gas bags having a joint portion at which ends of said material forming each gas bag are joined, and a protective member capable of reflecting radiant heat and covering the joint portion at the outer surface of each of said cylindrical gas bags, said protective member comprising a reflecting layer containing metallic powder, and a non-dense layer having evenly dispersed fine pores.

2. An escape device as claimed in claim 1, and further comprising a seal of a thermosetting elastomer covering said joint portion at the inner surface of each of the cylindrical gas bags.

3. An escape device as claimed in claim 1, wherein said protective member is in the form of a strip and said reflecting layer comprises a thermosetting elastomer containing said metallic powder.

* * * * *